No. 839,110. PATENTED DEC. 25, 1906.
G. E. CAPEN.
ROTARY HARROW.
APPLICATION FILED SEPT. 25, 1905.

3 SHEETS—SHEET 1.

Witnesses:
A. L. Lord.
L. L. Chandler.

Inventor,
George E. Capen,
By Fouts & Hull,
Attorneys.

No. 839,110. PATENTED DEC. 25, 1906.
G. E. CAPEN.
ROTARY HARROW.
APPLICATION FILED SEPT. 25, 1905.

3 SHEETS—SHEET 2.

Witnesses:
A. L. Lord.
L. L. Chandler.

Inventor,
George E. Capen,
By Fouts & Hull,
Attorneys.

No. 839,110. PATENTED DEC. 25, 1906.
G. E. CAPEN.
ROTARY HARROW.
APPLICATION FILED SEPT. 25, 1905.
3 SHEETS—SHEET 3.
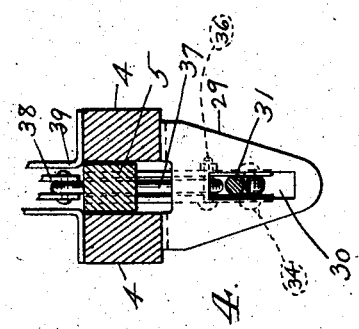
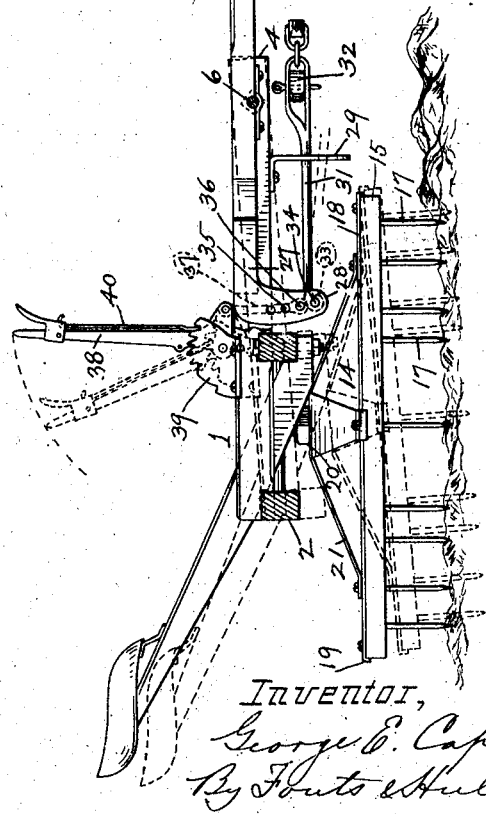
Witnesses:
A. L. Lord.
L. L. Chandler.
Inventor,
George E. Capen,
By Fouts & Hull,
Attorneys.

UNITED STATES PATENT OFFICE.

GEORGE E. CAPEN, OF BERLIN HEIGHTS, OHIO.

ROTARY HARROW.

No. 839,110.    Specification of Letters Patent.    Patented Dec. 25, 1906.

Application filed September 25, 1905. Serial No. 279,894.

*To all whom it may concern:*

Be it known that I, GEORGE E. CAPEN, residing at Berlin Heights, in the county of Erie and State of Ohio, have invented a certain new and useful Improvement in Rotary Harrows, of which the following is a full, clear, and exact description, reference being had to the accompanying drawings.

My invention relates to harrows, and particularly to rotary harrows, and has for its object to construct a harrow of this kind that may be employed as a vehicle for transportation from place to place, that shall be simple of construction and reliable in operation, and that may be readily adjusted to vary the depth to which the surface of the ground is worked.

Generally speaking, the invention may be defined as consisting of the combinations of elements embodied in the claims hereto annexed.

Figure 1:
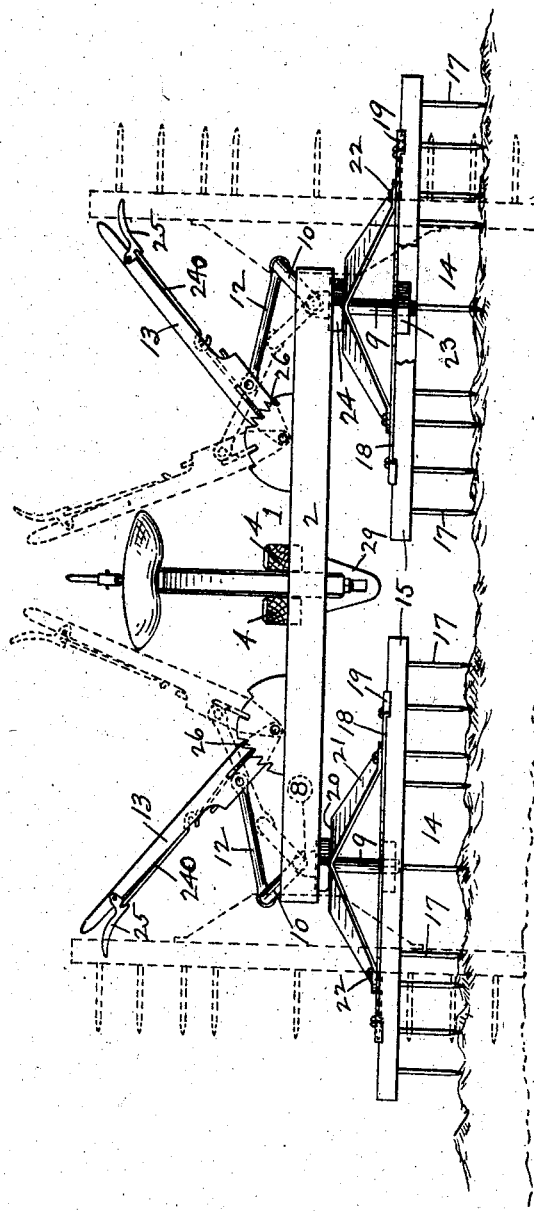
Figure 2:
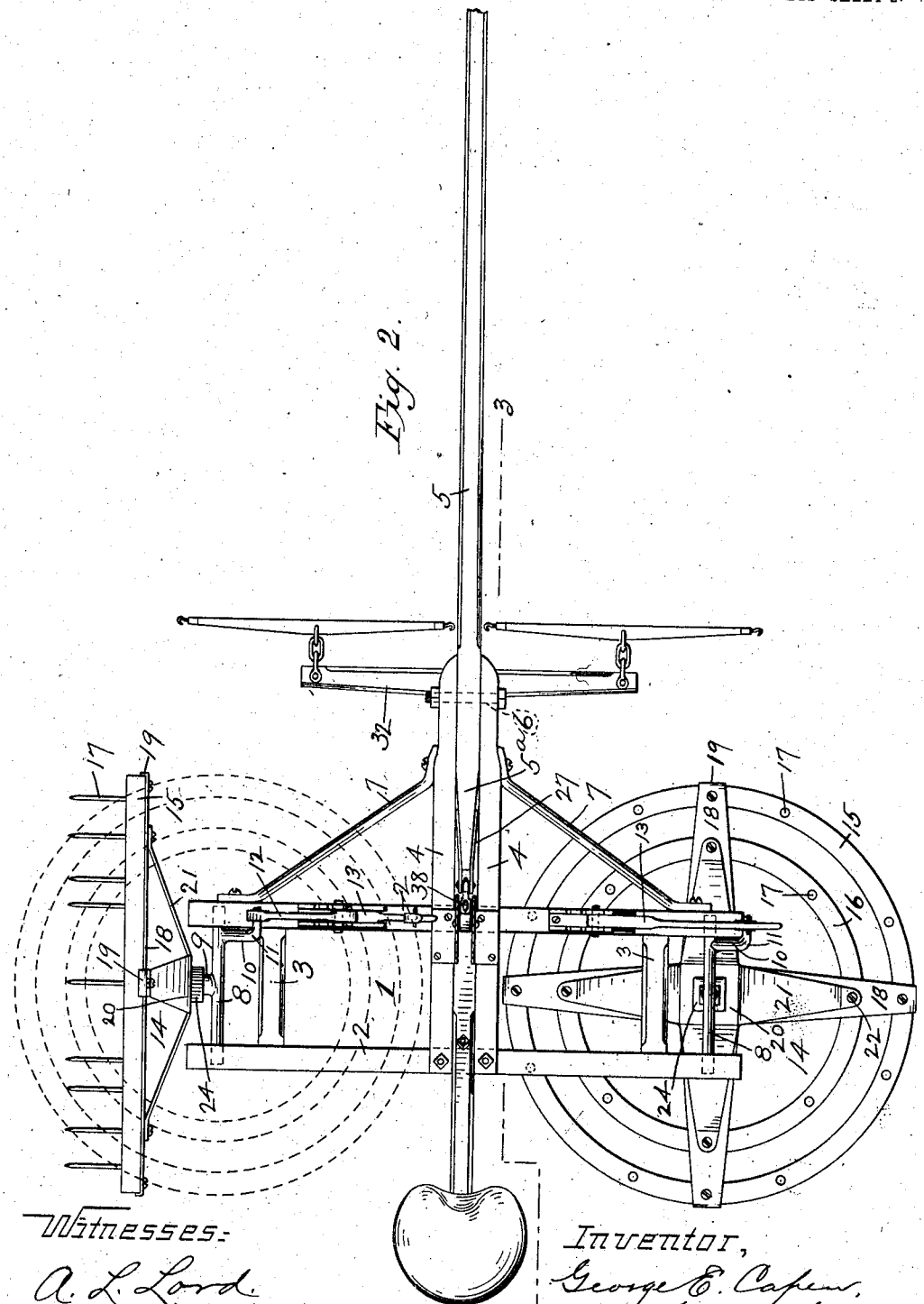

Referring to the drawings, Figure 1 represents a rear elevation of a harrow constructed in accordance with my invention, the dotted lines representing the position of the parts when the harrow members are employed as wheels. Fig. 2 represents a plan view of said harrow, one of the harrow members being shown in upturned position and the other in downturned position. Fig. 3 represents a longitudinal sectional view on the line 3 3 of Fig. 2, and Fig. 4 represents an enlarged detail of a portion of the means for adjusting the positions of the harrow members.

Describing the parts by reference-numerals, 1 represents the framework of the harrow, said framework comprising a pair of cross-beams 2, said beams being connected near their ends by short beams 3 and near their center by draft-beams 4, the latter extending forwardly a sufficient distance to provide for pivoting the tongue 5 thereto, as by means of a bolt 6. The draft members 4 are braced by suitable diagonal rods 7, connected thereto and to the forward cross-beam 2. 8 designates a pair of rock-shafts extending between and carried by the cross-beams 2. Projecting from each of these rock-shafts is a spindle 9 and an operating-arm 10, the end of which is bent at 11 to form a connection for the link 12, which extends to the operating-lever 13, by which the said shaft 8 is rotated.

14 designates a harrow member, two of which are shown, each of said members comprising an outer rim 15 and an inner rim 16. The rims 15 and 16 are provided with a suitable number of harrow-teeth 17. As a convenient means for connecting the rims of the harrow and carrying them from the rock-shafts I employ a suitable number of metallic plates or straps 18, extending radially across the members 15 and 16. Four such plates are shown and may be conveniently formed as a spider having a central portion from which the arms 18 radiate. The outer ends of these arms are turned downwardly at 19 over the outer surface of the rim 15. I also provide a spider having an elevated central portion 20 and downwardly-extending arms 21, which arms are connected to the arms 18 and the inner rim, as by bolts 22. This spider serves to brace the harrow members and the arms 18 and forms with the lower spider a hub for the spindle 9, said spindle extending through both spiders and being secured to the lower one, as by a nut 23.

A spacing nut or washer 24 may be applied to the spindle between the body 20 of the upper spider and the shaft 8, as shown in Figs. 1 and 3.

The levers 13 are each provided with an elongated pawl 240, having an operating-handle 25 adjacent the operating end of the lever, said pawl being adapted to engage the teeth 26 of a segmental ratchet to hold the harrow in horizontal or vertical position as desired. By merely operating the lever 13 the harrow members may be turned into vertical position and the outer rims may be utilized as wheels to convey the harrow from place to place. When desired to use the harrow as such, it is only necessary to lower the levers 13, allowing the harrows to assume the position shown in full lines in Fig. 1. By manipulating the levers the harrow members may be set at an inclination for sidehill work.

As it is desirable to adjust the harrow to cause the teeth to work the ground to a greater or lesser depth, I have provided suitable means for accomplishing this result. The tongue 5, as previously pointed out, is pivoted between the draft members 4 at a point near the forward end thereof, leaving a considerable portion 5ª of the tongue projecting rearwardly beyond such pivot. To the rear end of the tongue a downwardly-projecting bracket is secured, said bracket consisting of a pair of plates 27, bolted to the sides of the tongue and having each a downward extension 28, projecting between the draft members 4. A transverse plate 29 is secured beneath the draft members 4 and between the pivot and the plates 27. This plate is provided with a slot 30 therein for the reception of the draft-bar 31, said draft-bar carrying at its forward end the doubletree 32 and having its rear end formed into an eye 33, extended between the extensions 28 and connected thereto by means of a bolt 34, extending thereacross. Each of the plates of the bracket is provided with a plurality of openings 35, extending therethrough, said openings being adapted for the reception of a bolt 36.

37 designates a link pivotally connected to one end of the lever 38, said lever being pivoted adjacent to a segmental ratchet 39 and having a pawl 40, adapted to coact therewith. As the front end of the tongue is substantially fixed in position by reason of its attachment to the collars of the horses, the operation of the lever 38 will tilt the harrow bodily on the pivot 6, as indicated in dotted lines in Fig. 3. Should the lever be moved backwardly, the front of each of the harrow members will be correspondingly tilted, bringing the rear teeth deeper into the soil, as shown in Fig. 3. By shifting the bolt 36 in the openings 35 the adjustment of the parts is permitted. Furthermore, the provision of the depending bracket at the end of the tongue permits the draft to be applied beneath the tongue. This is advantageous in enabling the draft to be applied in the most effective manner whether the harrow member be in horizontal or vertical position. The slot 30 in the plate 29 allows of the adjustment of the lever 38 without interfering with the application of power to the draft-bar 31.

Having thus described my invention, what I claim as new, and desire to secure by Letters Patent, is—

1. In a rotary harrow, the combination of a pair of rock-shafts, a spindle projecting from each of said rock-shafts, a pair of rotary harrow members, each of said members having a pair of spiders connected thereto, said spiders being spaced at their middle portions, and a spindle projecting from each of said rock-shafts and extending through said spiders whereby said spiders constitute a hub for said spindle, substantially as specified.

2. A rotary harrow member comprising an inner and an outer rim, a spider having arms extending across said rims and connected thereto, a second spider connected to one of said rims and having its central portion spaced from the central portion of the former spider, combined with a rock-shaft having a spindle extending through the central portions of said spiders, and an operating-arm for said rock-shaft, substantially as specified.

3. A rotary harrow member provided with a rim, a metallic frame connected to said rim, said frame having spaced central portions, and a spindle extending through the central portions of said frame, substantially as specified.

4. A rotary harrow member having connected thereto a pair of frame-plates spaced apart at their central portions, and a spindle extending through the central portions of said plates, substantially as specified.

In testimony whereof I affix my signature in the presence of two witnesses.

GEORGE E. CAPEN.

Witnesses:
JAMES BUCK,
M. KARR.